(12) United States Patent
Kise et al.

(10) Patent No.: US 12,536,695 B2
(45) Date of Patent: Jan. 27, 2026

(54) TRENCH PROFILE DETERMINATION BY MOTION

(71) Applicant: DEERE & COMPANY, Moline, IL (US)

(72) Inventors: Michio Kise, Bondurant, IA (US); Boyoon Jung, Long Beach, CA (US); Cristian Dima, St. Ingbert / Rohrbach (DE)

(73) Assignee: Deere & Company, Moline, IL (US)

(*) Notice: Subject to any disclaimer, the term of this patent is extended or adjusted under 35 U.S.C. 154(b) by 422 days.

(21) Appl. No.: 17/900,612

(22) Filed: Aug. 31, 2022

(65) Prior Publication Data

US 2024/0070906 A1   Feb. 29, 2024

(51) Int. Cl.
 *G06T 7/73* (2017.01)
 *G06T 7/246* (2017.01)

(52) U.S. Cl.
 CPC ............... *G06T 7/74* (2017.01); *G06T 7/248* (2017.01); *G06T 2207/10016* (2013.01); *G06T 2207/10048* (2013.01); *G06T 2207/30188* (2013.01); *G06T 2207/30244* (2013.01)

(58) Field of Classification Search
 None
 See application file for complete search history.

(56) References Cited

U.S. PATENT DOCUMENTS

| | | | | |
|---|---|---|---|---|
| 5,883,383 A | * | 3/1999 | Dragne | A01C 7/105 |
| | | | | 250/222.2 |
| 2017/0221217 A1 | * | 8/2017 | Hong | G06T 7/248 |
| 2020/0352088 A1 | | 11/2020 | Arnett et al. | |
| 2021/0307236 A1 | | 10/2021 | Strnad et al. | |
| 2022/0217898 A1 | * | 7/2022 | Walter | A01C 5/062 |
| 2022/0279704 A1 | | 9/2022 | Sharda et al. | |
| 2023/0189691 A1 | * | 6/2023 | Strnad | A01C 7/105 |
| | | | | 111/121 |

(Continued)

FOREIGN PATENT DOCUMENTS

| | | | | |
|---|---|---|---|---|
| CN | 108694805 A | * | 10/2018 | ............. G08B 21/00 |
| EP | 2949194 A1 | | 12/2015 | |

(Continued)

OTHER PUBLICATIONS

Specification tables for Basler ace camera models, www.imrnasia.com/download/basler/baslerAceUSB30.pdf. Dated Jun. 2018.*

(Continued)

*Primary Examiner* — Andrew W Bee
*Assistant Examiner* — Christine Zhao
(74) *Attorney, Agent, or Firm* — Taft Stettinius & Hollister LLP; Stephen F. Rost (57) ABSTRACT

A method for identifying geometric parameters of a trench during a planting process. The method includes, providing image data of the trench from a camera to a computing device, the image data including more than one image, identifying at least one artifact in a first image and a second image of the image data, determining camera displacement between the first image and the second image, and applying the camera displacement and positioning of the at least one artifact to identify a geometric location of the at least one artifact identified in the first image and the second image.

17 Claims, 6 Drawing Sheets

(56) References Cited

U.S. PATENT DOCUMENTS

2023/0403971 A1* 12/2023 Koch .................. G01N 21/359
2023/0417727 A1* 12/2023 Stoller ................. G01N 33/24

FOREIGN PATENT DOCUMENTS

WO  WO-2014020320 A1 * 2/2014  ......... A63F 13/5378
WO  WO-2021021594 A1 * 2/2021  ............ A01B 79/02

OTHER PUBLICATIONS

Extended European Search Report and Written Opinion issued in European Patent Application No. 23189524.4, dated Jan. 29, 2024, in 13 pages.

* cited by examiner

TRENCH PROFILE DETERMINATION BY MOTION

FIELD OF THE DISCLOSURE

The present disclosure relates to estimating profile characteristics of a trench during a planting operation, and more specifically to estimating the profile characteristics of the trench using images of the trench and artifacts captured by a camera.

BACKGROUND OF THE DISCLOSURE

Planter row units are commonly used in the agricultural industry to plant seed and corresponding commodity in the ground. Planter row units often include various ground-engaging tools that assist in the commodity or seed deposition process by, for example, opening furrows to form trenches, placing or depositing commodity and seed in the trenches, packing the soil, and closing the furrows or trenches over the newly-deposited commodity and seed. From the operator's cab, it is difficult to see the shape of the trench after formation of the trench because the closing wheels on the planter row unit close or replace the displaced soil into the trench after depositing the seed and commodity in the trench. It is also difficult to see deposition of the commodity and seeds in the trench because the closing wheels close the trench quickly.

In a typical planter row unit it is very difficult to identify the shape of the trench or furrow or location of the seed and commodity therein during operation. To see the trench before it is closed, the user must stop movement of the agricultural machine that is pulling the planter row unit and exit the cab to visually inspect the shape of the trench or furrow and placement of the seed and commodity therein. Typically, a user will begin planting a crop in a field by placing seed in a trench for a short distance, such as 15 to 20 feet, before stopping the tractor and walking to visually inspect the seeds that were placed in that 15 to 20 feet of field by removing soil to find the seeds. When the user stops the tractor and exits the operator's cab for visual inspection of the planted seeds, this decreases efficiency and decreases productivity among other things.

Further contributions in this area of technology are needed to increase efficiency, increase productivity, and increase the quality of trench formation and commodity placement by planter row units during operation. Therefore, there remains a significant need for the apparatuses, methods, and systems disclosed herein.

SUMMARY

One embodiment is a method for identifying geometric parameters of a trench during a planting process. The method includes, providing image data of the trench from a camera to a computing device, the image data including more than one image, identifying at least one artifact in a first image and a second image of the image data, determining camera displacement between the first image and the second image, and applying the camera displacement and positioning of the at least one artifact to identify a geometric location of the at least one artifact identified in the first image and the second image.

One example of this embodiment includes identifying a top surface and a trench depth relative to the top surface. Another example includes identifying a seed in the image data. Part of this example includes identifying relative motion of the seed relative to the artifacts in the image data. Another part of this example includes associating the identified seed with a corresponding geographic location.

In another example of this embodiment, the profile is developed by identifying the position of artifacts in the first image relative to the second image to determine the distance of the artifacts from the camera. Yet another example includes identifying stationary artifacts that are stationary on the underlying surface and moving artifacts that have moved along the underlying surface between the first image and the second image. In part of this example, the moving artifacts are determined by comparing all artifact data to determine artifact changes that are inconsistent with the remaining artifacts.

Yet another example of this embodiment includes directing an illumination source towards the trench when capturing image data. Another example includes providing image sequences from the camera to the computing device in one or more of a visible light spectrum, near-infrared spectrum, or infrared spectrum. In yet another example the computing device only substantially uses the image data and vehicle speed to develop the profile. Another example includes identifying more than ten artifacts. In another example, the artifacts are areas in the image data having high local texture and are tracked from the first image to the second image. Another example of this embodiment includes moving the camera along a plane that is substantially parallel to the underlying surface between the first image and the second image.

Another embodiment of this disclosure is a method for identifying a location of a seed in a trench. The method includes providing image data of the trench from a camera to a computing device, the image data including more than one image, determining a camera displacement of the camera between each image, identifying a seed in a first image and a second image of the image data, and using the camera displacement to determine a geometric location of the seed in the trench based on the camera displacement and a perceived displacement of the seed between the first image and the second image.

One example of this embodiment includes identifying artifacts on a top surface in the image data to determine a distance of the top surface from the camera. Part of this example includes identifying motion of the seed relative to artifacts in the image data.

Another example includes associating a location of the seed in the trench with a corresponding geographic location. Yet another example of this embodiment includes developing a profile of the trench by identifying the position of a plurality of artifacts in the first image relative to the second image to determine the distance of the artifacts from the camera.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 4b is a schematic representation of a second image of an open furrow providing a moved perspective with artifacts identified throughout compared to the location of the same artifact in FIG. 4a.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Some of the benefits of the present disclosure include measuring and visualizing a three dimensional (3D) geometric shape of a seed trench or furrow created by a planter row unit. The present disclosure utilizes a camera attached to the planter row unit to provide image data to a computing device to be further analyzed to determine a geometric parameters of the seed trench among other things. Geometric parameters may be one or more of the profile of the seed trench walls, the depth of the seed trench, and the 3D location of artifacts or the seed within the seed trench among other spatial information.

The camera may provide image data comprising two or more images taken sequentially as planter row unit travels along an underlying surface. The displacement of the camera between the images may also be recorded or determined for the associated images. Based on displacement of artifacts, such as the seed, identified by the computing system in the image date and the displacement of the camera between the images, the 3D shape of the trench can be determined.

Figure 1:
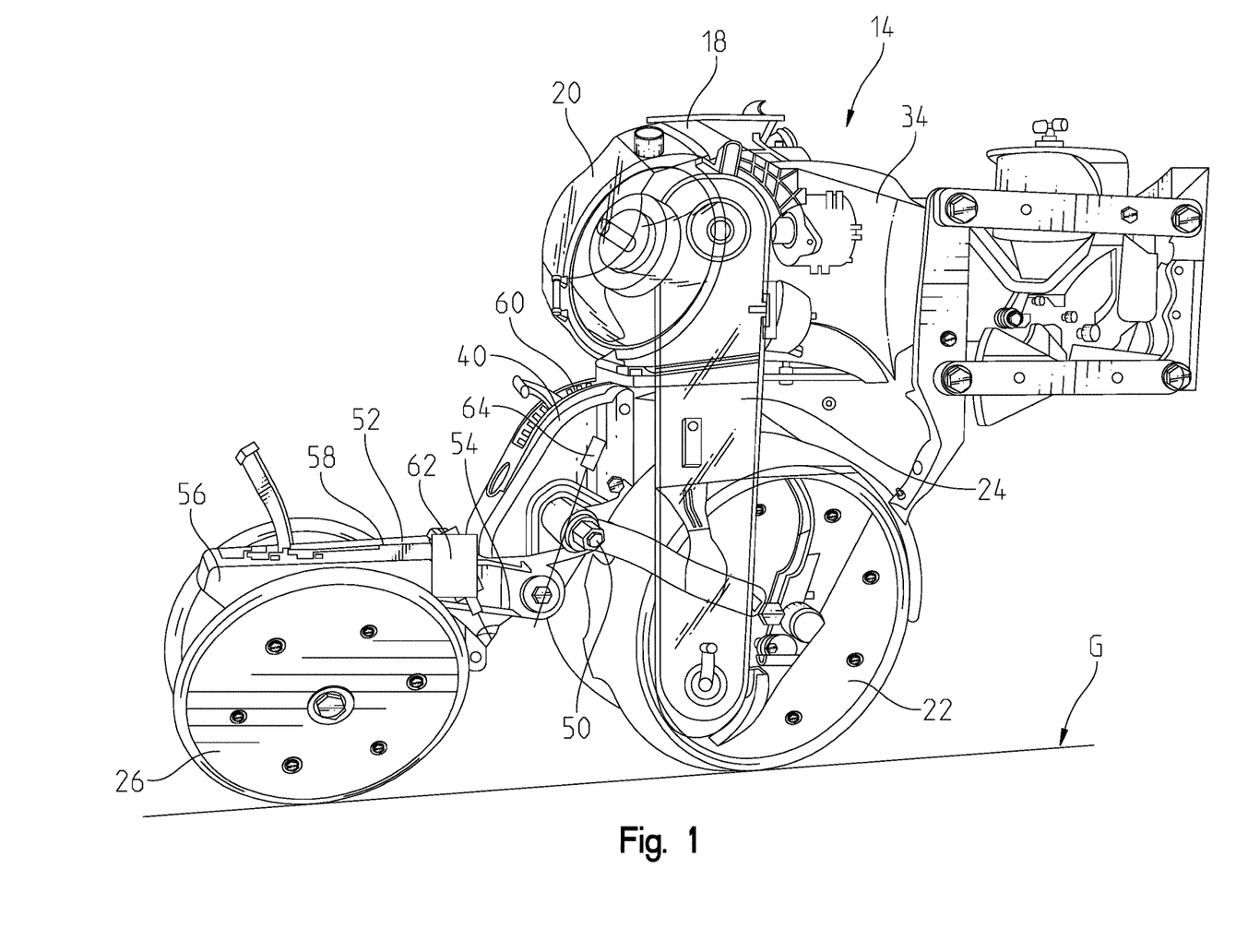
FIG. 1 is a side view of one embodiment of a planter row unit.

Referring now to FIG. 1 of the present disclosure, one exemplary embodiment of a planter row unit 14 connected to an agricultural work machine (not illustrated) such as a planter or seeder is shown. The planter row unit 14 is an illustrative embodiment wherein other embodiments of planter row units can be used with the present disclosure. In FIG. 1, only a single planter row unit 14 is shown, but a plurality of planter row units 14 may be coupled to a frame of the agricultural work machine in any known manner. The planter row unit 14 may be coupled to the frame by a linkage (not illustrated) so that the planter row unit 14 can move up and down to a limited degree relative to the frame.

Each planter row unit 14 may include an auxiliary or secondary hopper 18 for holding product such as fertilizer, seed, chemical, or any other known product or commodity. In this embodiment, the secondary hopper 18 may hold seed. As such, a seed meter 20 is shown for metering seed received from the secondary seed hopper 18. A furrow opener or opening wheel 22 may be provided on the planter row unit 14 for forming a furrow or trench in a field for receiving metered seed (or other product) from the seed meter 20. The seed or other product may be transferred to the trench from the seed meter 20 by a seed tube 24 or a brushbelt assembly. A closing assembly or closing wheel 26 may be coupled to each planter row unit 14 and is used to close the furrow or trench with the seed or other product contained therein.

In one embodiment, the seed meter 20 is a vacuum seed meter, although in alternative embodiments other types of seed meters using mechanical assemblies or positive air pressure may also be used for metering seed or other product. In one embodiment, a brushbelt assembly distributes the seed into the corresponding furrow or trench. As described above, the present disclosure is not solely limited to dispensing seed. Rather, the principles and teachings of the present disclosure may also be used to apply non-seed products to the field. For seed and non-seed products, the planter row unit 14 may be considered an application unit with a secondary hopper 18 for holding product, a product meter for metering product received from the secondary hopper 18 and an applicator for applying the metered product to a field. For example, a dry chemical fertilizer or pesticide may be directed to the secondary hopper 18 and metered by the product meter 20 and applied to the field by the applicator.

The planter row unit 14 includes a shank 40 that extends away from a body portion 34. The shank 40 is pivotally coupled at pivot 50 to a shank extension 52. The shank extension 52 has a pivot end 54 that is pivotably connected to the pivot 50 and an opposite shank extension end 56 with a shank body portion 58 that spans between the pivot end 54 and the shank extension end 56. The planter row unit 14 includes a pair of gauge wheels rotatably mounted on the body portion 34 and a pair of closing wheels 26 rotatably mounted on the shank extension 52. The pair of opening wheels 22 form an actual trench or furrow 202 (see FIG. 2) in the underlying surface, for example ground surface G, during operation of the planter row unit 14. Alternatively, other opening devices can be used in place of the pair of opening wheels 22. The pair of closing wheels 26 close or cover the actual trench or furrow 202 with displaced soil that occurs from the pair of opening wheels 22 opening or forming the trench 202 in the ground surface G. Alternatively, other closing devices can be used in place of the pair of closing wheels 26.

Figure 2:
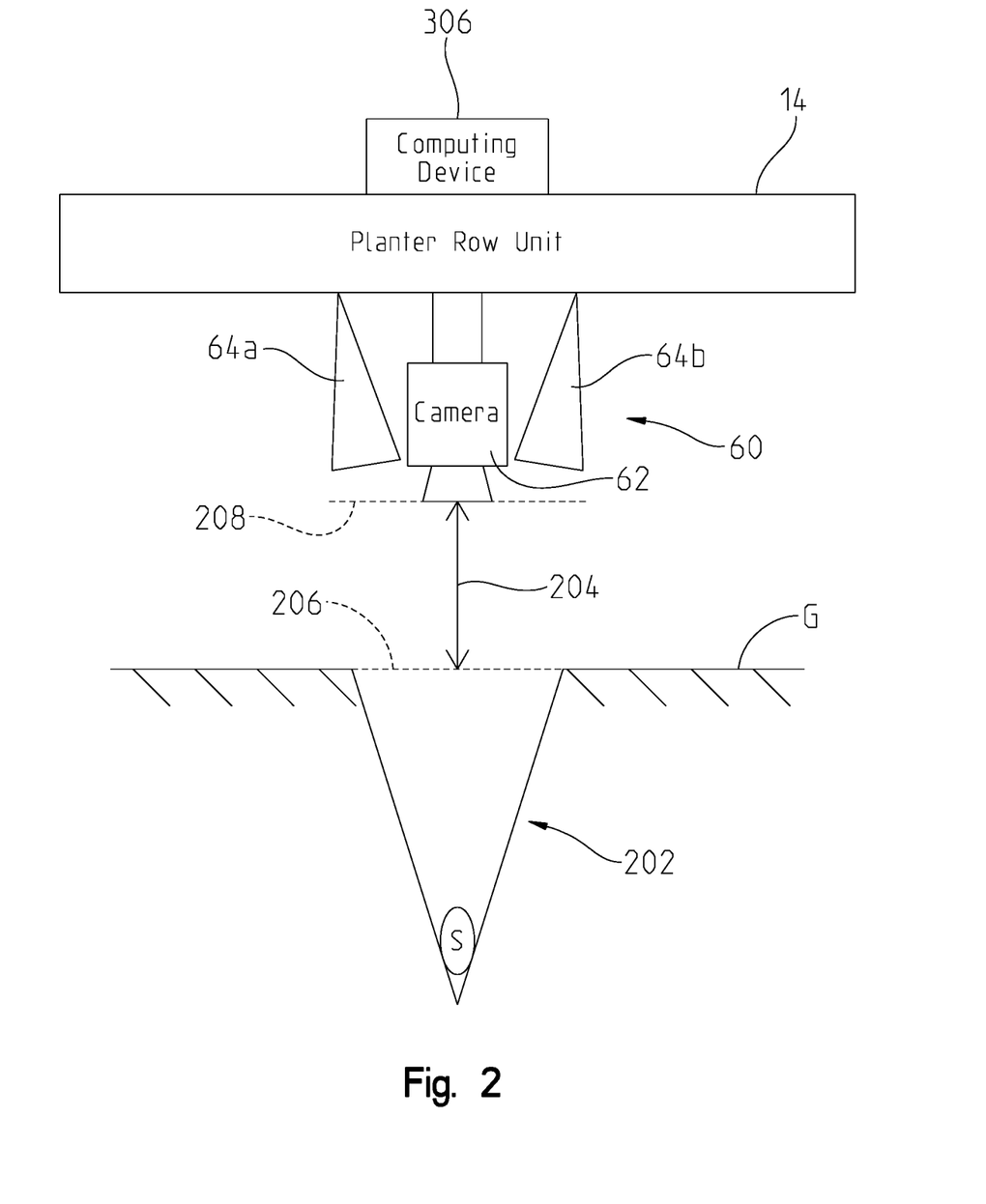
FIG. 2 is a schematic representation of an open furrow with a seed positioned therein by a planter row unit.

A visualization system 60 is operably connected and mounted to the planter row unit 14 as illustrated in FIGS. 1 and 2. The visualization system 60 includes a camera 62 and may include one or more light 64a, 64b. The camera 62 is mounted between the pair of closing wheels 26 and the pair of opening wheels 22 or alternatively the camera 62 is mounted between the pair of closing wheels 26 and the seed tube 24. In other embodiments, the camera 62 is positioned at any location that provides a visual perspective to the camera 62 of the opened furrow 202. The light 64 is also mounted between the pair of closing wheels 26 and the pair of opening wheels 22 or alternatively the light 64 is mounted between the pair of closing wheels 26 and the seed tube 24. In other embodiments, the light 64 is positioned at any location that allows the light 64 to illuminate the opened furrow or trench for the camera 62.

In any embodiment, the camera 62 is oriented to point down towards the ground surface G at the actual trench 202 that is formed by the pair of opening wheels 22. As such, the camera 62 and the light 64 can be operated in the visible spectrum range, or outside of the visible spectrum range such as infrared range in order to have better air obscurant penetration such as dust penetration. While the actual trench 202 is formed by the gauge wheels 22, soil and dust can fill or permeate the air so it is difficult for the operator or a conventional color camera to capture the actual trench 202 cross-sectional shape. A near infrared camera, such as a short wavelength infrared camera, can be used in one embodiment of this disclosure. In another embodiment, the camera 62 may provide image data in a visible light spectrum, near-infrared spectrum, or infrared spectrum.

Figure 3:
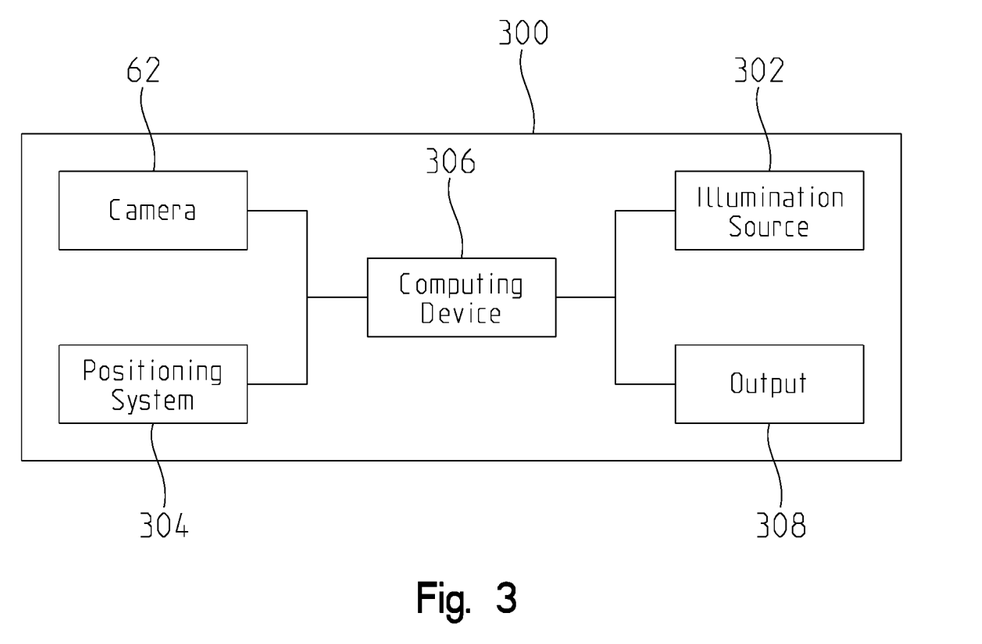
FIG. 3 is a schematic representation of components of an agricultural work machine.

In certain embodiments, the visualization system 60 includes or is operatively connected to a computing device 306 such as a controller structured to perform certain operations to control the camera 62 and the light 64. In certain embodiments, the camera 62 includes the controller. In certain embodiments, the controller forms a portion of a processing subsystem including one or more computing devices having memory, processing, and communication hardware. The controller may be a single device or a distributed device, and the functions of the controller may be performed by hardware or by instructions encoded on computer readable medium. The controller may be included within, partially included within, or completely separated from other controllers (not shown) associated with the work machine and/or the visualization system 60. The controller is in communication with any sensor or other apparatus throughout the visualization system 60, including through direct communication, communication over a datalink, and/or through communication with other controllers or portions of the processing subsystem that provide sensor and/or other information to the controller.

In certain embodiments, the computing device 306 is described as functionally executing certain operations. The descriptions herein including the controller operations emphasizes the structural independence of the computing device 306, and illustrates one grouping of operations and responsibilities of the computing device 306. Other groupings that execute similar overall operations are understood within the scope of the present application. Aspects of the computing device 306 may be implemented in hardware and/or by a computer executing instructions stored in non-transient memory on one or more computer readable media, and the computing device 306 may be distributed across various hardware or computer based components.

Example and non-limiting computing device 306 implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any computing device described herein that would be understood by one of skill in the art is contemplated herein. The computing devices herein, once the operations are described, are capable of numerous hardware and/or computer based implementations, many of the specific implementations of which involve mechanical steps for one of skill in the art having the benefit of the disclosures herein and the understanding of the operations of the computing devices provided by the present disclosure.

One of skill in the art, having the benefit of the disclosures herein, will recognize that the computing devices, controllers, control systems and control methods disclosed herein are structured to perform operations that improve various technologies and provide improvements in various technological fields. Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Referring now specifically to FIG. 2, a schematic section view of components of this disclosure is illustrated. More specifically, a section view looking down the length of the open furrow 202 with a seed S positioned therein is illustrated. From this perspective, the camera 62 is illustrated directed down towards the furrow 202. The camera 62 may be positioned on the row unit 14 such that the camera 62 can capture image data of the furrow 202 while in the opened configuration (i.e., between the opening wheels 22 and closing wheels 26). Lights 64*a*, 64*b* may be positioned adjacent to the camera 62 to generally illuminate the open furrow 202 to provide enhanced image data. While the lights 64*a*, 64*b* are illustrated on opposing sides of the camera 62 relative to the furrow 202 in FIG. 2, this disclosure contemplates positioning the lights 64*a*, 64*b* in front of and behind the camera 62 from the perspective of FIG. 2. Alternatively, a light or lights may be positioned around the camera 62 or in any configuration that illuminates the furrow 202.

While two lights 64*a*, 64*b* are illustrated in FIG. 2, this disclosure contemplates using more, or fewer lights, if any at all. In one aspect of this disclosure, a plurality of lights may substantially surround the camera 62. In yet another embodiment, only one light may be positioned next to the camera 62 to illuminate the furrow 202. In yet another embodiment, the camera 62 may be configured to provide sufficient image data based on the expected ambient lighting conditions of a field and not require any additional lighting at all.

As illustrated in FIG. 2, the camera 62 may be a distance 204 from a ground plane 206. The ground plane 206 may generally represent the planar orientation of the surface of the unopened ground G surrounding the furrow 202. The distance 204 may be generally known based on the fixed positioning of the camera 62 to the planter row unit 14 and the planting depth of the planter row unit 14. In other words, the camera 62 may typically move in a horizontal plane 208 parallel to the ground plane 206 and adjustments to the planting depth of the planter row unit 14 will adjust the distance 204 of the camera 62 from the ground G.

Referring to FIG. 3, a schematic representation of select components of an agricultural work machine 300 is illustrated. The agricultural work machine 300 may be coupled to, and include, the planter row unit 14 to selectively move the planter row unit 14 along the underlying surface or ground G. The agricultural work machine 300 may include the camera 62 and an illumination source 302 such as lights 64*a* and 64*b*. Further, the agricultural work machine 300 may include a positioning system 304. The positioning system 304 may be a Global Positioning System ("GPS") capable of identifying the geographic location of the agricultural work machine 300. The positioning system 304 may include a vehicle speed sensor wherein the speed of the agricultural work machine 300 is specifically monitored. In one aspect of this disclosure, the speed of the agricultural work machine 300 is determined using the displacement of the geographic location via GPS. Regardless, the positioning system 304 may be used by the computing device 306 to determine the displacement of the camera 62 between image captures. For example, if the camera 62 is mounted to a tool bar of the work machine 300, the computing device 306 may utilize vehicle speed between image captures to determine camera 62 displacement between image captures. Similarly, the computing device 306 may record the geographic location of the camera 62 or the work machine 300 and determine the geographic distance displacement between the image captures.

The camera 62 and positioning system 304 may be communicatively coupled to the computing device 306. Further, the computing device 306 may be communicatively coupled to an output 308. The output 308 may be a visual display in a cab of the work machine 300, an audio device, or a haptic feedback device that may be selectively engaged by the computing device 306 to provide information about the agricultural work machine 300. In yet another embodiment considered herein, the output 308 may be wirelessly transmitted to a remote device to be used by a remote user. In one aspect of this disclosure, the output 308 may provide access to a remote database such as a cloud-based system. The computing device 306 may be, or include, the controller discussed herein. Alternatively, the computing device 306 may be any control module or the like on the agricultural work machine 300. Accordingly, the computing device 306 contemplated herein may be any device capable of analyzing inputs and providing outputs as discussed herein.

The camera 62 may provide image data to the computing device 306 showing the status of the furrow 202 among other things. The positioning system 304 may provide geographic coordinates to the computing device 306 that correspond with the image data provided by the camera 62 such that each image produced by the camera may be associated with a corresponding geographic coordinate to determine the displacement of the camera 62 between each image. Similarly, the positioning system 304 may provide the speed of the agricultural work machine 300 and the corresponding timing of the image capture to the computing device 306. The computing device 306 may also associate the speed provided by the positioning system 304 with a particular image from the camera 62 and the time between corresponding image captures. The illumination source 302 may be selectively controlled by the computing device 306 in one embodiment. In another embodiment, the illumination source 302 may not be controlled by the computing device 306. In yet another embodiment, there may be no illumination source 302 at all.

Figure 4A:
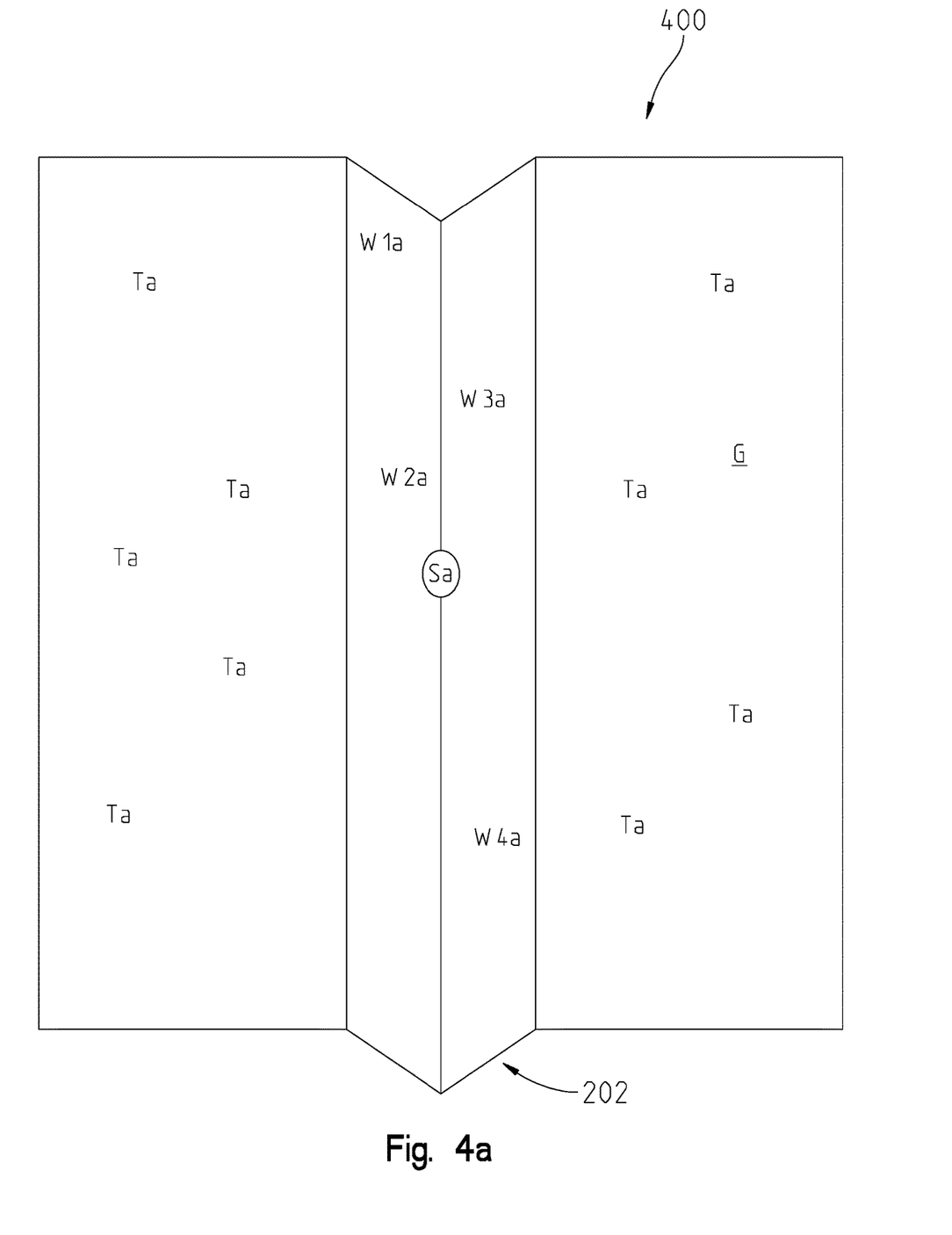
FIG. 4a is a schematic representation of a first image of an open furrow with artifacts identified throughout.

Referring now to FIG. 4a, one exemplary first image 400 of the furrow 202 as captured from the camera 62 as positioned in FIG. 2 is illustrated. The first image 400 may be processed by the computing device 306 to identify artifacts on the surface of the ground G and within the furrow 202. The artifacts identified by the computing device 306 may be portions of the image having a pixel intensity and color that is different than the surrounding area. More specifically, the computing device 306 may identify artifacts on the top surface of the ground G labelled as "Ta" in FIG. 4. The top surface artifacts Ta may be general debris often found on the topmost surface of the ground G. These top surface artifacts Ta may include rocks, plant debris, soil indentations, or any other distinguishing characteristic that may stand out relative to the surrounding ground G.

The computing device 306 may also identify artifacts along the walls of the furrow 202. These artifacts are labelled as W1a-W4a in FIG. 4a. The wall artifacts W1a-W4a may similarly be any unique identifier that can be determined on the wall of the furrow 202 based on the image provided to the computing device 306 from the camera 62. Accordingly, the wall artifacts W1a-W4a may be rocks, plant debris, soil abnormalities, or any other distinguishing features in the furrow 202 wall.

The computing device 306 may also identify any seeds Sa positioned within the furrow 202 in the first image 400. While the term seed and letter "S" is used herein, the seed Sa could be any commodity distributed from the row planter 14. For example, this disclosure contemplates identifying and monitoring fertilizer distributed in the furrow as well. Alternatively, any material that is selectively positioned in the furrow 202 by the row planter 14 may be considered a seed Sa for the purposes of this disclosure.

Figure 4B:
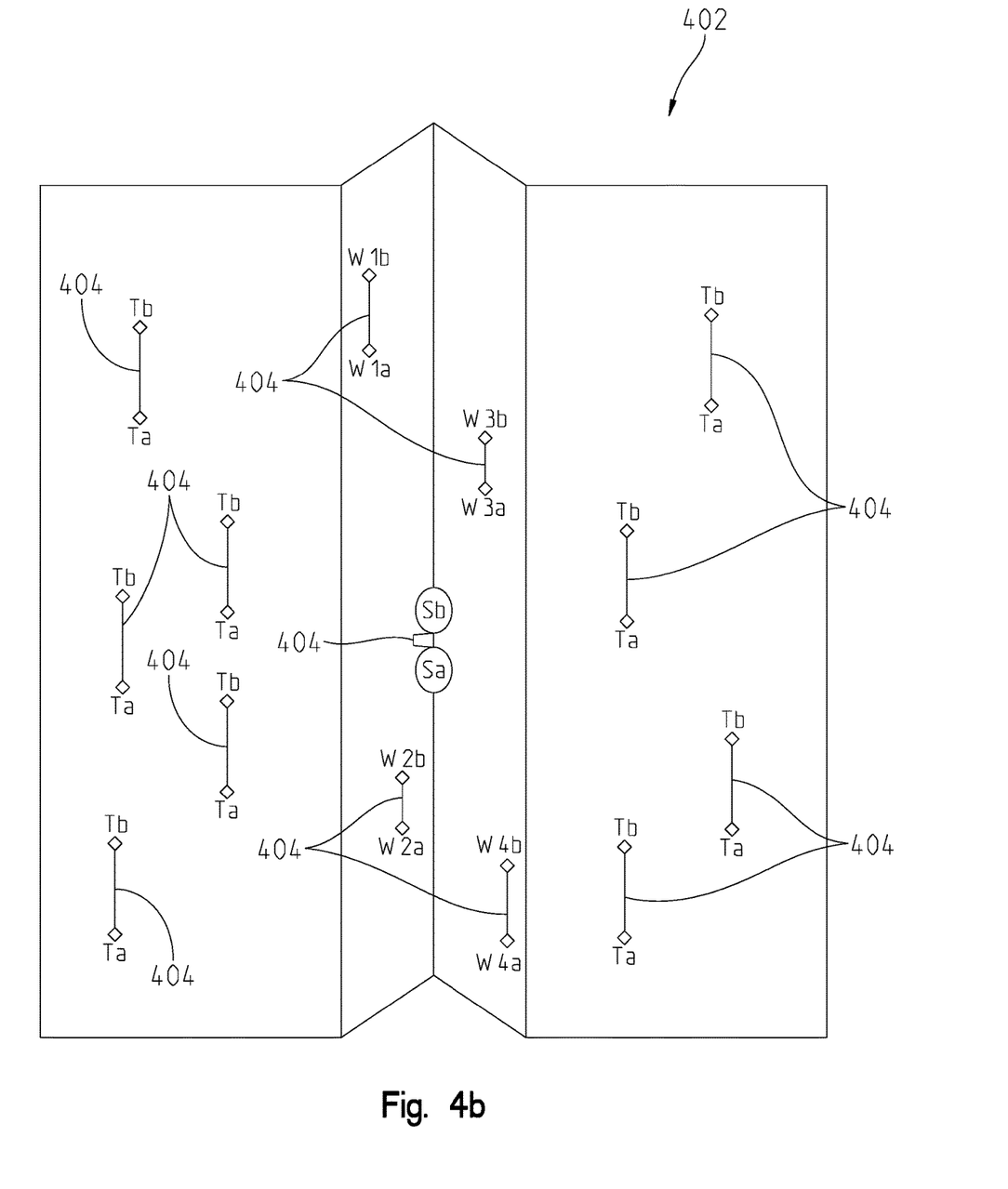

Referring now to FIG. 4b, a schematic representation of a second image 402 captured by the camera 62 as positioned in FIG. 2 is illustrated. The second image 402 may have been captured a short period of time after the first image 400 as the row planter 14 travels along the ground G. As such, the second image 402 may capture the same artifacts as discussed herein for the first image 400 but the location of the artifacts within the frame of the second image 402 may be different than the location of the artifacts in the first image 400. More specifically, FIG. 4b illustrates the artifact location from the first image 400 with an "a" and the artifacts from the second image 402 with a "b" to illustrate the movement of the artifacts within the frame of the first and second image 400, 402 as if the second image 402 was overlaid on the first image 400.

Regarding the surface "T" artifacts in FIG. 4b, each artifact may appear to have been displaced by an anticipated distance from the perspective of the camera 62 between the first image artifact Ta and the second image artifact Tb. The displacement of the surface artifacts Ta, Tb may appear consistent across all surface artifacts Ta, Tb because they are all positioned on approximately the same surface plane of the ground G and therefore they are all being consistently displaced from the perspective of the camera 62. As such, a perceived displacement 404 of the Ta, Tb artifacts is consistent across the ground surface G.

The apparent spacing of the artifacts in the wall of the furrow (W1a-W4a, W1b-W4b), however, will yield different results depending on the distance of the wall artifact W from the camera 62. For example, the center of the furrow 202 may be farther from the camera 62 than the sidewall of the furrow 202 close the surface plane of the ground G. In this configuration, the perceived displacement 404 of the wall artifact W between the first image 400 and the second image 402 may depend on the positioning of the wall artifact W in the wall of the furrow 202. More specifically, the wall artifact W1a-W1b may have a perceived displacement 404 that is greater than the wall artifact W2a-W2b between the first and second image 400, 402 because the wall artifact W2a-W2b is spaced farther from the camera 62 than the wall artifact W1a-W1b. Accordingly, in one aspect of this disclosure the computing device 306 may utilize the perceived displacement 404 of the identified artifacts between the first image 400 and the second image 402 to determine the distance of the artifact from the camera 62. Similarly, the distance of the seed Sa, Sb may be determined based on the perceived displacement 404 of the seed while considering the displacement of the camera 62 between image captures.

Figure 5:
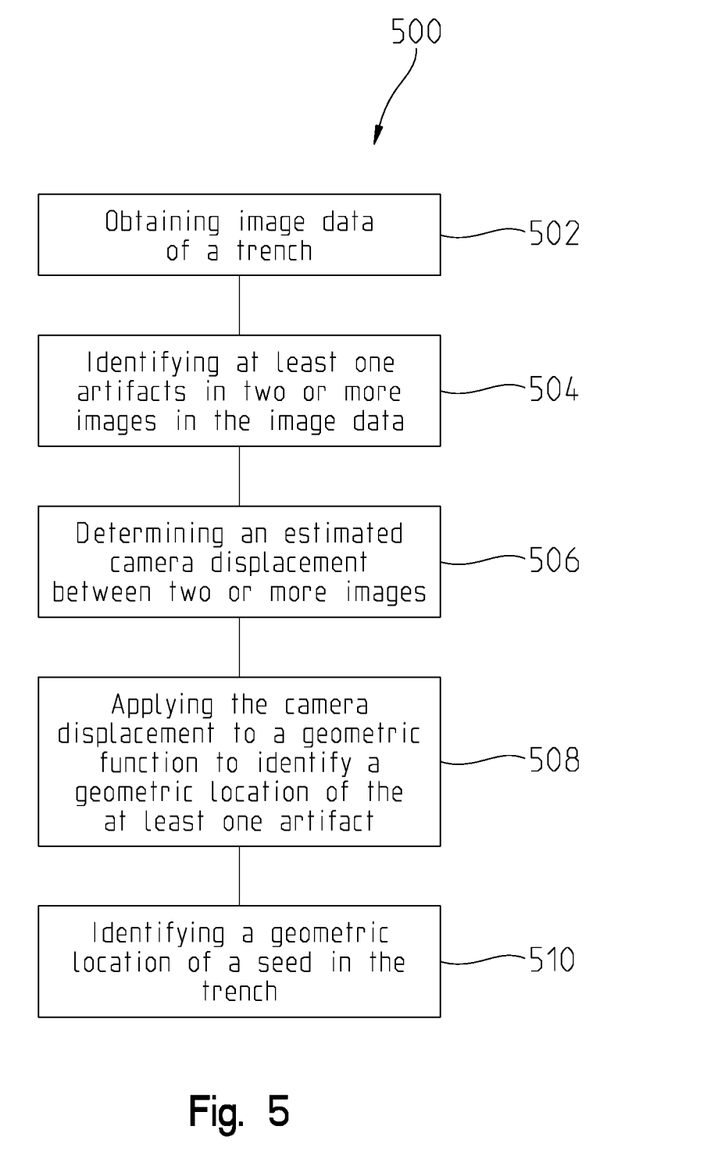
FIG. 5 is a logic flow chart of one embodiment of this disclosure.

Referring now to FIG. 5, one example of a logic flowchart 500 to determine furrow geometry and seed position information is illustrated. The logic flowchart 500 may be implemented by the computing device 306 discussed herein. Alternatively, any device capable of receiving and analyzing image data may implement the logic flowchart 500. In box 502, the computing device 306 may obtain image data of the trench or furrow 202. The image data may be captured by the camera 62 discussed herein and contain at least two different images of the open furrow 202 (i.e., the first image 400 and the second image 402). The two different images may be taken by the camera 62 in a preset time sequence relative to one another. The computing device 306 may obtain and store with the image data a timestamp indicating the precise time each image in the image data was captured. Alternatively, or additionally, each image of the image data may be associated with a geographic location.

The computing device 306 may then identify artifacts within each image of the image data obtained in box 502. Artifacts may be those discussed herein for FIGS. 4a-4b. Artifacts may be any pixel intensity patterns that are uniquely identifiable. For example, artifacts may be locations in the image that have high local gradients in pixel intensity values. As discussed herein, artifacts such as rocks, plant debris, soil deformations, seeds, fertilizer and the like can be identified as an artifact by the computing device 306. More specifically, any object that creates a distinguishable feature in the image may be labelled as an artifact by the computing device 306 in box 504.

In one aspect of this disclosure, the at least two images in the image data are compared to one another in box 506 to determine the perceived displacement of the artifact between images. The perceived displacement may be the distance the artifact appears to have moved in the subsequent images. For example, artifact Ta is identified in the first image and the same artifact Tb is identified in the second image.

Further, the perceived displacement of the artifacts relative to the camera from box 506 may be used by the computing device 306 to develop a profile of the trench or furrow 202 based on the image data and the estimated camera displacement in box 508. More specifically, the computing device 306 may determine the displacement of the camera 62 between image captures using any of the methods considered herein. For example, the computing device 306 may determine camera displacement based on average recorded vehicle speeds of the corresponding work machine between image captures along with the relative time between image captures. Alternatively, the computing device 306 may record the geographic location of the camera 62 at the time of each image capture and determine camera displacement based on the geographic coordinates recorded at the corresponding image captures.

Once the displacement of the camera 62 is determined, the displacement of the camera may be applied to a geometric function to identify the geometric location of artifacts and seeds or other commodities identified in the image data. More specifically, the perceived displacement 404 distance of the artifacts between the first image and the second image of the image data may be processed by the geometric function to identify a geometric location of the corresponding artifact from the camera 62. For example, the Ta and Tb artifacts may all be on the ground surface G and therefore have a perceived displacement 404 that is expected for coplanar artifacts. In this orientation, the computing device 306 may analyze the displacement between the artifacts and note that each of the Ta, Tb artifacts have the expected perceived displacement 404 for co-planar artifacts between the first image and the second image and must therefore be on about the same plane at a distance from the camera 62. However, any artifacts identified in the trench or furrow 202 may have a perceived displacement 404 between the first image and the second image that is indicative of their increased distance from the camera 62 compared to the Ta, Tb artifacts. In this orientation, the computing device 306 may identify the smaller perceived displacement 404 between the artifacts in the trench or furrow 202 to indicate the artifacts are farther from the camera then the artifacts on the surface of the ground (i.e., Ta and Tb artifacts).

As the artifacts in the trench or furrow 202 are identified closer to the base of the trench or furrow 202 (i.e., farther from the camera 62), the perceived displacement 404 may be correspondingly less. For example, the perceived displacement 404 between W4a, W4b may be less than the perceived displacement 404 between the Ta, Tb artifacts because the W4a, W4b artifacts are farther from the camera 62 than the Ta, Tb artifacts. However, the perceived displacement 404 of the W4a, W4b may be greater than the perceived displacement 404 of the W2a, W2b artifact that is positioned closer to the valley of the trench or furrow 202 than the W4a, W4b artifact and therefor farther from the camera 62.

Any number of artifacts may be identified in the image data to develop a profile of the trench or furrow 202. As discussed herein, the perceived displacement 404 of each artifact from the first image to the second image may, together with the estimated displacement of the camera itself, be used to determine the distance of that artifact from the camera 62 by the box 506. Accordingly, a plurality of artifacts may be identified on the ground G and in the walls of the trench or furrow 202 to generate a profile of the trench or furrow 202 based on the distances of the artifacts from the camera 62. In this example, the more artifacts identified and tracked by the computing device 306 may provide a more precise profile of the trench or furrow 202.

The term "perceived displacement" refers to the displacement of the artifact from one image captured by the camera 62 to another. As discussed herein, the camera 62 is coupled to the row planter unit 14 in a fixed orientation. Accordingly, as the planter row unit 14 moves along the ground plane 206 of the ground G, the camera 62 maintains substantially the same orientation towards the ground G while moving along the horizontal plane 208. As discussed herein, the "perceived displacement" of the artifact may be different depending on the distance of the artifact from the camera 62 even though the actual displacement of the artifact did not change relative to the ground (i.e., the artifact did not move relative to the ground). That is to say, the perceived displacement may be the apparent distance between the artifacts of the first image 400 compared to the location of the artifacts in the second image 402 when the images are overlaid with one another to align the total image capture perimeters with one another. In other words, the images are not adjusted to align artifacts but rather are aligned so the complete image of the first image 400 and the second image 402 are aligned showing the shift of the artifacts in the corresponding images.

The seed S may also be identified by the computing device 306 by analyzing the image data. The seed S may have one or more distinct identifiers such as size, color, and location, among others, that may be applied by the computing device 306 to specifically identify the seed artifact Sa, Sb in both the first image 400 and the second image 402 of the image data. In the ideal positioning, the seed S may be positioned in the bottom-most portion of the trench or furrow 202 as illustrated in FIG. 2. As such, the perceived displacement 404 of the seed Sa, Sb may be the smaller than the surrounding artifacts from the wall of the trench or furrow 202 and the artifacts Ta, Tb on the surface of the ground G because the seed Sa, Sb is farther from the camera 62 than the other artifacts.

In one aspect of this disclosure, the logic flowchart 500 discussed herein can be implemented by the computing device 306 to establish a 3D profile of the trench or furrow 202 and the location of the seed S therein. Among other things, this may allow the computing device 306 or a user to flag issues with the open trench. For example, the 3D profile generated by the computing device 306 may illustrate when one of the furrow 202 walls has collapsed. Further, the 3D profile generated by the computing device 306 may identify the actual depth of the open trench or furrow 202. Further still, the 3D profile generated by the computing device 306 may identify the location and number of seeds deposited in the furrow 202 along with seed spacing.

The location characteristics of the seed S from box 510 may include the specific geographic location of the seed in the furrow 202. More specifically, the agricultural work machine 300 may have a positioning system 304 having GPS. The specific GPS coordinates of the agricultural work machine 300 may be stored with the image data and specifically associated with each image therein. The computing device 306 may have access to data providing the geometric relationships of the camera 62 relative to the GPS on the agricultural work machine. Utilizing the GPS coordinates of the agricultural work machine 300 and the geometric relationship of the camera 62 relative to the precise GPS location of the work machine 300, the computing device 306 may determine the exact location of the seed S within the furrow 202. In other words, the computing device may store the GPS location associated with each image in the image data and flag any seeds identified in the image. The specific GPS location of the seed may be determined based on the GPS location associated with the specific camera 62 that captured the image adjusted for the specific location of the seed within the image. In this configuration, the specific GPS location for the specific seed may be stored by the computing device 306.

In yet another aspect of this disclosure, the computing device 306 may determine whether the seed S has moved relative to the surrounding artifacts in box 510. More specifically, if the perceived displacement of the seed from Sa to Sb is inconsistent with the perceived displacement of the surrounding artifacts, the computing device 306 may determine that the seed S may have rolled or otherwise moved within the trench or furrow 202 after being deposited therein.

Any one of the conditions discussed herein may be identified by the output 308 of the computing device 306. More specifically, the output 308 may be a display providing a real-time visual stream of the images captured by the camera 62. Further, the output 308 may include a visual indicator of the geographic location of each seed S. The output 308 may also include a warning if the trench or furrow 202 is not properly formed. The output may also provide a warning if the seed S is not properly positioned within the trench or furrow 202 or if the seed S is substantially moving after being deposited therein. The output 308 may also display statistics derived from the estimated characteristics of the trench profiles.

In one embodiment of this disclosure, the logic flowchart 500 may be implemented considering only the image data provided by the camera 62 along with the camera displacement data. That is to say, no additional sensors are required to generate the profile of the trench or furrow 202 or identify the location characteristics of the seed S. However, other embodiments considered herein may utilize additional sensors to verify and refine the information determined by the computing device 306.

In one aspect of this disclosure, structure from motion techniques may be applied to determine the geometric location of an artifact identified in the images. More specifically, incremental structure from motion techniques may be applied by incorporating successive images produced by the camera 62. In one example, a large enough number of corresponding artifacts are required to estimate an essential or fundamental matrix between two successive images. The change in camera position and orientation (e.g., pixel-intensity or artifact comparison) is used to estimate the essential or fundamental matrix between subsequent images.

In one aspect of this disclosure, structure from motion techniques may be applied by extracting features, such as artifacts, from the first image. Next, the same features or artifacts may be extracted from the second image. The computing device may then select corresponding points by matching the features or artifacts between the two images. The computing device may then estimate or otherwise determine projection matrices of the camera at the time the image was captured and the position of the corresponding points in a geometric location in 3D space relative to the camera.

The computing device may do this repeatedly for successive images by extracting features or artifacts from new images. The computing device may then estimate the projection matrix of the camera in the new image by matching the existing features or artifacts of the corresponding points from previous images. The computing device may use the new image to further estimate the position of the new features or artifacts that have been identified in at least two images. The computing device may also adjust all projection matrices and corresponding point positions to minimize reprojection error among other things.

In one aspect of this disclosure, the camera 62 may be calibrated and only one camera 62 may be used to take successive images. In this configuration, intrinsic parameters are known and identical for all successive images. The motion of the camera 62 is bounded by the motion of the planter, which is typically primarily linear. This restriction provides an extra constraint in estimating an essential or corresponding matrix. In this embodiment, the structure from motion concepts could be implemented to estimate projection matrices up to one parameter ambiguity corresponding to an unknown scale for the camera translation. For example, GPS measurements or other information from the positioning system 304 might be used to resolve scale ambiguity.

In another aspect of this disclosure, the computing device 306 may implement an outlier removal step to remove features whose motion don't match with the motion of the majority. The computing device 306 may do this, in part, b assuming the majority of features belong to static objects and flagging or removing features that are inconsistent with the majority.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for identifying geometric parameters of a trench during a planting process, comprising:
   providing image data of the trench from a camera to a computing device, the image data including more than one image;
   identifying at least one artifact in a first image and a second image of the image data;
   determining camera displacement between the first image and the second image;
   applying the camera displacement and positioning of the at least one artifact to identify a geometric location of the at least one artifact identified in the first image and the second image;
   considering the geometric location of the at least one artifact to generate a profile of a trench wall as part of the geometric parameters;
   identifying a seed in the image data and identifying relative motion of the seed relative to the artifact in the image data; and
   providing a warning if the seed is moving.

2. The method of claim 1, further comprising identifying a top surface and a trench depth relative to the top surface.

3. The method of claim 1, further comprising associating the identified seed with a corresponding geographic location.

4. The method of claim 1, wherein the profile of the trench wall is generated by identifying the position of a plurality of artifacts in the first image relative to the second image to determine the distance of the artifact from the camera.

5. The method of claim 1, further comprising identifying stationary artifacts that are stationary on the underlying surface and identifying moving artifacts that have moved along the underlying surface between the first image and the second image.

6. The method of claim 5, wherein the moving artifacts are determined by comparing all artifact data to determine artifact changes that are inconsistent with the remaining artifacts.

7. The method of claim 1, further comprising directing an illumination source towards the trench when capturing image data.

8. The method of claim 1, further comprising providing image sequences from the camera to the computing device in one or more of a visible light spectrum, near-infrared spectrum, or infrared spectrum.

9. The method of claim 1, wherein the computing device only uses the image data and camera displacement to develop the geometric location of the at least one artifact.

10. The method of claim 1, further comprising identifying more than one artifact.

11. The method of claim 1, wherein the at least one artifact is in an area in the image data having high local pixel intensity and is tracked from the first image to the second image.

12. The method of claim 1, further comprising moving the camera along a plane that is substantially parallel to the underlying surface between the first image and the second image.

13. A method for identifying a location of a seed in a trench, comprising:
    providing image data of the trench from a camera to a computing device, the image data including more than one image;
    determining a camera displacement of the camera between each image;
    identifying a seed in a first image and a second image of the image data;
    generating a profile of a trench wall using at least one artifact from the first image compared to the second image;
    using the camera displacement to determine a geometric location of the seed relative to the trench wall based on the camera displacement and a perceived displacement of the seed and artifact between the first image and the second image; and
    identifying relative motion of the seed relative to the artifact in the image data and providing a warning if the seed is moving.

14. The method of claim 13, wherein the at least one artifact comprises an artifact on a top surface in the image data identified to determine a depth of the seed relative to the top surface.

15. The method of claim 13, further comprising identifying a geographic location of the seed in the trench with the computing device.

16. The method of claim 13, wherein the profile of the trench wall is developed by identifying the positions of a plurality of artifacts in the first image relative to the second image to determine geometric locations of the plurality of artifacts relative to the camera.

17. The method of claim 13, further comprising moving the camera along a plane that is substantially parallel to an underlying surface between the first image and the second image.

* * * * *